United States Patent [19]
Müller

[11] Patent Number: 5,199,313
[45] Date of Patent: Apr. 6, 1993

[54] AUTOMATIC SELECTOR DEVICE OF A CHANGE-SPEED GEARBOX OF A MOTOR VEHICLE

[75] Inventor: Alfons Müller, Rheinhausen, Fed. Rep. of Germany

[73] Assignee: Mercedes-Benz AG, Fed. Rep. of Germany

[21] Appl. No.: 917,171

[22] Filed: Jul. 23, 1992

[30] Foreign Application Priority Data

Jul. 23, 1991 [DE] Fed. Rep. of Germany ....... 4124384

[51] Int. Cl.$^5$ .............................................. B60K 20/10
[52] U.S. Cl. ................................... 74/335; 192/85 R; 137/596.16
[58] Field of Search .............. 74/335; 192/3.58, 85 R; 137/596.16

[56] References Cited

U.S. PATENT DOCUMENTS

| | | | |
|---|---|---|---|
| 3,918,488 | 11/1975 | Minami | 137/596.16 X |
| 4,560,047 | 12/1985 | McCarthy et al. | 137/596.16 X |
| 5,035,312 | 7/1991 | Asayama et al. | 192/85 R |
| 5,036,965 | 8/1991 | Cortesi et al. | 192/85 R |

FOREIGN PATENT DOCUMENTS

| | | |
|---|---|---|
| 23213 | 2/1987 | Austria . |
| 2212679 | 8/1974 | Fed. Rep. of Germany . |

*Primary Examiner*—Dirk Wright
*Attorney, Agent, or Firm*—Evenson, Wands, Edwards, Lenahan & McKeown

[57] ABSTRACT

In an automatic selector device of a motor vehicle change-speed gearbox, a frictional connection (i.e., a clutch or brake) which can be engaged and disengaged by a gear retention control valve is held in the instantaneous position on the occurrence of a fault in an electronic control unit. An auxiliary control force for actuating the gear retention control valve is obtained from a magnetic force of an electromagnetic control valve for the gear change. The electromagnetic valve is dependent on the control unit.

4 Claims, 2 Drawing Sheets

AUTOMATIC SELECTOR DEVICE OF A CHANGE-SPEED GEARBOX OF A MOTOR VEHICLE

CROSS-REFERENCE TO RELATED APPLICATION

This applications is related to application Ser. No. 07/908,255 filed Jul. 6, 1992 in the name of Lutz Paulsen, et al. for AUTOMATIC SELECTOR OF A MOTOR VEHICLE EPICYCLIC CHANGE-SPEED GEARBOX and application Ser. No. 07/914,536 filed Jul. 17, 1992 in the name of Lutz Paulsen for AUTOMATIC SELECTOR DEVICE FOR A MOTOR VEHICLE CHANGE-SPEED GEARBOX.

BACKGROUND AND SUMMARY OF THE INVENTION

The present invention relates to an automatic selector device of a change-speed gearbox of a motor vehicle with a frictional connection (i.e., a clutch or brake) which can be engaged by a selector setting element, a selector valve for subjecting the selector setting element to working pressure and a gear retention control valve connected to the selector setting element and to the selector valve.

DE-AS 22 12 679 shows a hydraulic selector device for power shift gearboxes having gear selector valves connected to a pressure conduit and movable into selector position by electromagnetically actuated pilot control valves. Each of the gear selector valves controls a conduit connection between the pressure conduit and a gear clutch, and has a device in the gear selector valves by way of which, on gear change, the engagement or disengagement of the clutches is controlled with overlap. Each gear selector valve contains, on the same axis, a selector spool with two spool parts with two spool surfaces of different sizes together with a control spool and a plurality of shut-off spools. The spool part with the smaller spool surface faces towards the control spool, and the shut-off spools connect to the other spool part. The pressure conduit for connecting the spool part with the larger spool surface to the ventilation hole is released by the other spool part; each clutch is connected to a selector spool of its associated gear selector valve and to a shut-off spool of each of the other gear selector valves.

In this known selector device, an effort is made to avoid incorrect gear selections so that, should defects appear in the electrical part of the selector device, it is impossible for two gears to be engaged simultaneously. For this purpose, the arrangement in the known selector device is such that intermediate valves are located between the pilot control valves and the gear selector valves. These intermediate valves are connected to the pilot control valves by the control conduits. Furthermore, the intermediate valves are connected in series in a bypass conduit of the pressure conduit, with the intermediate valves each controlling one of the bypass conduits which can be connected to the gear selector valves as a function of the pilot control valves which can be actuated individually or in combination.

An electrohydraulic control system for controlling a plurality of hydraulic load devices is shown AT E 23 213 B. This system has a plurality of multi-position control valves, (in fact, one for each load device) in order to control the flow of fluid to and the removal of fluid from the load devices. Each control valve has first and second hydraulic servo-devices in order to move the control valve into its respective first and second positions. In addition, the system includes a plurality of pilot control valves actuated by an electromagnetic winding (one winding for each control valve). It is possible to actuate each pilot control valve in order to supply fluid to the corresponding servo-device and to move the corresponding control valve into one of its two end positions.

The objective of this known control system is to improve an electrohydraulic control system which uses a minimum number of valves actuated by electromagnetic windings and is reliable in its mode of operation. For this purpose, the known control system provides for the control valves to be two-position valves, for the pilot control valves actuated by electromagnetic winding to supply fluid to corresponding first servo-devices in order to move their associated control valves into a first position and, by way of a reset valve, which can be actuated by an electromagnetic winding. The reset valve is common to the control valves and can be actuated in order to supply fluid to the second servo-devices in order to move each control valve into its second position. In this manner, the necessary number of valves actuated by electromagnetic winding is only greater than the number of load devices by one number.

In another known selector device shown in ATZ 88, No. 12, page 681 (1986), division into an electronic part and a hydraulic part is provided. Whereas the hydraulics are responsible, inter alia, for subjecting the respectively actuated selector setting elements to pressure, the electronics control the gear change and also, to some extent, the level of the hydraulic pressure.

The connection between the electronics and the hydraulics is generally effected by electromagnetic 3/2-way valves. These are configured such that, when they are excited (i.e. when an electric current flows through their coil), the associated selector setting element is subjected to hydraulic pressure. Interruption of the flow of current to the solenoid valves, whether or not this is due to a defect in the electronic control or failure of the voltage supply, leads to interruption of the force path. This can lead to dangerous driving situations either because, in overrun, the engine brake (and possibly a retarder located in front of the gearbox) become ineffective or, when the engine is providing traction, the engine torque is no longer available on a gradient.

In order to avoid the above-mentioned problem for example, so-called locking solenoid valves can be used. These locking solenoid valves are equipped with a permanent magnet which ensures that in the absence of a supply of current, the solenoid valve remains in a position once it has been reached. Switching over into the respective other position takes place by way of a short selector pulse whose sign defines the position selected.

A disadvantage of this solution, apart from the relatively complicated design of the electromagnetic valve and the triggering necessary using a reversible current direction, is that the valve position selected is not unambiguously defined when there is no current flowing through the coil. Thus it could happen, for example, that a valve previously located in the activated position could move unintentionally into the deactivated position due to vibration, external magnetic fields, etc. This would again deprive the respective selector setting element of pressure.

Even more serious in such a solution would be the problem of defined deactivation. If the electrical connection to a solenoid valve should be interrupted, the latter and therefore the associated selector setting element could no longer be deactivated so that, for example, it would be more difficult to tow the vehicle, or the gearbox could even be jammed if a different frictional connection (clutch or brake) were deactivated.

In the selector device according to the above-mentioned patent application Ser. No. 07/914,536, with the same priority, these disadvantages are avoided. A gear retention control valve is used which can be moved into its gear retention position by spring force and into its gear release position by an electromagnet. With a plurality of selector setting elements, such a gear retention control valve can only be associated with one selector setting element in each case, and the number of selector setting elements then is equal to the number of gear retention control valves. A common gear retention control valve can be used for either a plurality of or all of the selector setting elements.

In all instances with the selector device according to the related patent application, the gear retention control valve can be used for those selector devices in which a common pressure control valve controls the working pressure for a plurality of selector setting elements and an electromagnetic 3/2-way control valve is respectively used both for the selector valve and for the control valve. The gear retention control valve can also be applied in a corresponding manner to those selector devices in which the working pressure for each selector setting element is separately controlled. For this purpose, a pressure control valve is respectively used both for the selector valve and for the control valve.

The gear retention control valve is switched over first in the case of a failure of the electronics so that the section of the control pressure conduit connected to the selector valve is connected to the working pressure conduit of the relevant selector setting element. If, on one hand, the control pressure conduit, and therefore also the working pressure conduit, were previously unpressurized, the selector setting element also remains deactivated. If, on the other hand, the working pressure of the selector setting element is above a certain pressure level, the selector valve is held in its correspondingly open position by the working pressure. The selector setting element, therefore, remains activated. The gear retention control valve is, however, itself electromagnetically actuated so that it requires both special triggering by the electronic control unit and a special functional configuration of this control unit.

An object of the present invention is to keep the control requirements for the gear retention control valve small in a selector device described in the related patent application.

This object has been achieved in an advantageous manner according to the present invention by providing an automatic selector device of a motor vehicle change-speed gearbox with a frictional connection, a selector setting element for engaging the frictional connection, and a selector valve which has at least one gear position which subjects the selector setting element to working pressure and one zero position which switches off the working pressure from the selector setting element. A spring force moves the selector valve into the zero position, and a pressure surface acts in opposition to the spring force and can be subjected to a control pressure to move the selector valve into a gear position. An electromagnetic control valve whose excitation is influenced by an electronic control unit adjusts the control pressure in proportion to the excitation to move the selector valve into a gear position. A control pressure conduit connects the selector valve to the control valve.

A gear retention control valve is located in the control pressure conduit and has a gear release position and a gear retention position. A spring force moves the gear retention control valve into the gear retention position. An auxiliary control force, which is derived from a magnetic force of the control valve resulting from a permanent minimum excitation, is used to move the gear retention control valve into the gear release position. A conduit section of the control pressure conduit connects the selector valve to the gear retention control valve. In the gear release position, the conduit section is connected to the control valve and is shut off from the selector setting element. In the gear retention position, the conduit section is connected to the selector setting element and is shut off from the control valve. The pressure surface of the selector valve is dimensioned such that the pressure force which results from the control pressure generated by the minimum excitation is smaller than the spring force for moving the selector valve into the zero position.

In the selector device according to the present invention, neither special triggering of the gear retention control valve by the electronic control unit nor a special functional configuration of this unit is necessary. This is because the gear retention control valve is moved into its gear release position by, for example, the control pressure resulting from a permanent minimum excitation of the control valve and, on the occurrence of a fault in the control unit (in which case, the minimum excitation of the control valve also fails as a side effect), is moved into its gear retention position by spring force. The selector valve pressure surface subject to the control pressure is dimensioned such that the minimum excitation is not sufficient to generate a control pressure force which overcomes the spring force for moving the selector valve into the zero position.

Whereas a special pressure medium setting element is additionally required in the case of a pressure actuation of the gear retention control valve, the present invention allows an actuation of the gear retention control valve derived mechanically from the magnetic force of the control valve, and no special setting element is necessary for this actuation. To this end, a structural and functional combination of the control valve and the gear retention control valve is provided.

If a pressure control valve is used for the selector valve, the valve can have a pressure surface configured for feedback of the controlled working pressure. The surface determines the position assumed by the selector valve in the event of a malfunction during which the gear retention control valve is actuated into its gear retention position.

BRIEF DESCRIPTION OF THE DRAWINGS

These and other objects, features and advantages of the present invention will become more readily apparent from the following detailed description of a currently preferred embodiment when taken in conjunction with the accompanying drawings wherein.

DETAILED DESCRIPTION OF THE DRAWINGS

Figure 1:
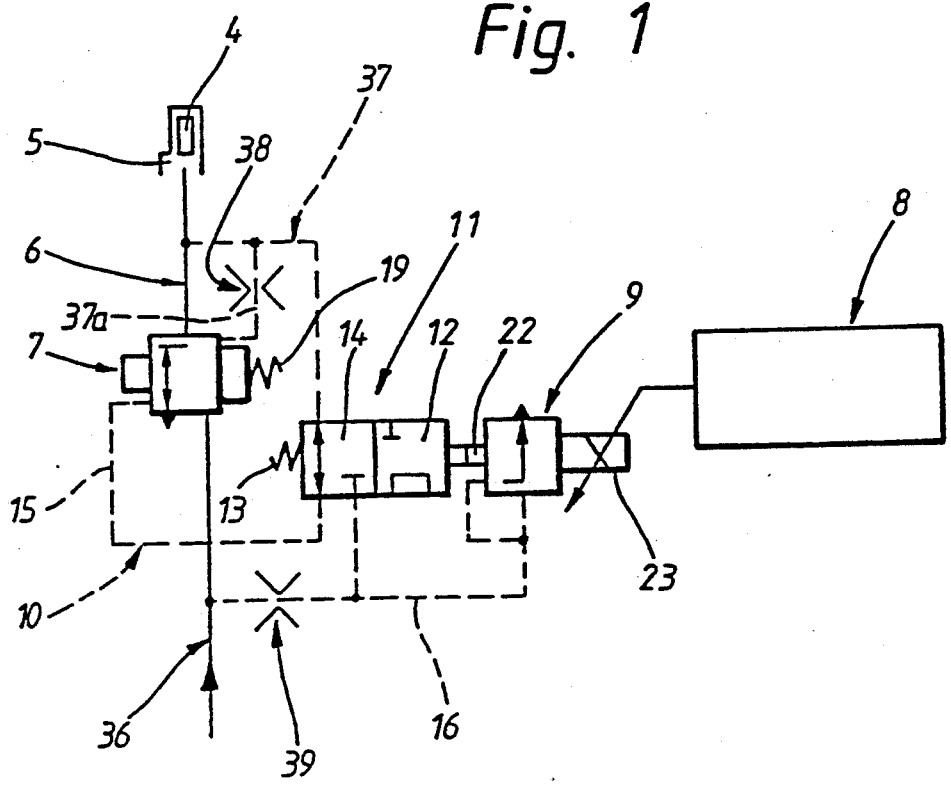
FIG. 1 is a schematic circuit diagram of an automatic selector device according to the present invention; in which only the features necessary for understanding are represented.

Referring first to FIG. 1, a frictional connection 4 (clutch) of a conventional epicyclic change-speed gearbox not shown) can be engaged by a pressure medium selector setting element 5 of a conventional axial spool type which is connected by a working pressure conduit 6 to a pilot-controlled pressure control valve used as the selector valve 7 which is supplied with the system pressure of a system pressure conduit 36. Oppositely connected to the selector valve 7 are a control pressure conduit 10 coming from an electromagnetic pressure control valve 9, and a control pressure conduit 37, which includes a throttle 38 branched off from the working pressure conduit 6. The control spool or valve spool 18 (FIG. 2) of the selector valve 7 is in a condition of equilibrium between a spring force 19 and the additive pressure force of the control pressure conduit 37, on the one hand, and the pressure force of the control pressure conduit 10, on the other hand.

A 3/2-way gear retention control valve 11 is included in the control pressure conduit 10 and is connected to the working pressure conduit 6 via the control pressure conduit 37 used as the return. The gear retention control valve 11 can be moved by spring force 13 into a gear retention position 14 in which the control pressure conduit 10 is shut off and the section 15, of the control pressure conduit 10, connected to the selector valve 7 is connected to the working pressure conduit 6 via the control pressure conduit 37. The gear retention control valve 11 can be moved by the armature 22 of the electromagnet 23 of the control valve 9 into a gear release position 12 in which the control pressure conduit 10, which has a section 16 connected to the control valve 9 and branched off from the system pressure conduit 36 via a throttle 39, is released and is shut off relative to the control pressure conduit 37.

The position of the control valve 9 and the level of the control pressure is determined by the condition of equilibrium between the magnetic force of the electromagnet 23, on one hand, and the spring force 13 and the additive control pressure force of the conduit section 16 of the control pressure conduit 10, on the other. The excitation of the electromagnet 23 is adjusted by an electronic control unit 8.

Figure 3:
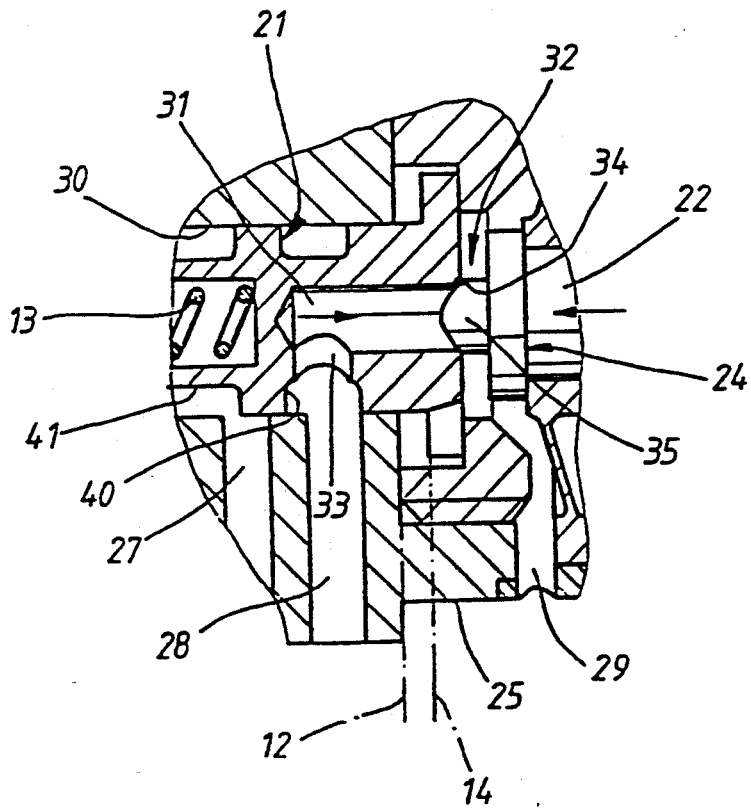
FIG. 3 is a fragmentary cross-sectional view showing the control valve of the selector device of FIG. 2 on an enlarged scale.
Figure 2:
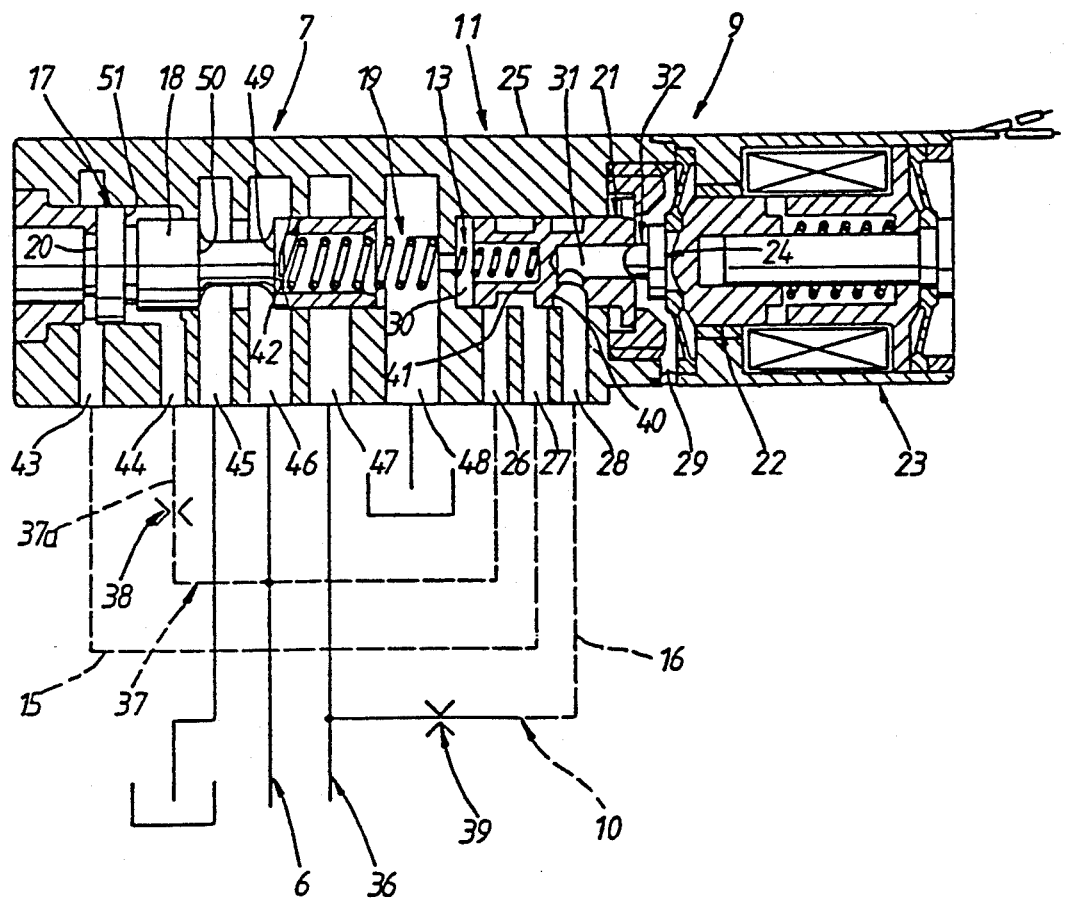
FIG. 2 is a cross-sectional view of an embodiment of the selector device of FIG. 1 in which the gear retention control valve and the control valve are structurally combined and the associated selector valve is also accommodated in the related valve housing.

Referring to FIGS. 2 and 3, a valve housing 25 has three housing connections 26 to 28 of the gear retention control valve 11 for the connection of the control pressure conduit 37 and the conduit sections 15, 16 of the control pressure conduit 10, an additional housing connection 29 for a pressure-relieved return and a central hole 30, itself connected to the housing connections 26 to 29, for a valve spool 21 of the gear retention control valve 11. The valve spool 21 is provided with an axial valve passage 31 for a shut-off valve 32 of the control valve 9.

One end 33 of the valve passage 31 is continually connected to the housing connection 28 for the conduit section 16 of the control pressure conduit 10 while the other end of the valve passage 31 is configured as the valve seat 34 (FIG. 3) for the valve closing element 35 of the shut-off valve 32 effectively located between the housing connections 28 and 29. The valve closing element 35 is connected by a pressure piece 24 to the armature 22 of the electromagnet 23 so that it cannot move relative to this armature, i.e. it is fixed to the armature. The valve spool 21 is shown in FIG. 2 in the gear retention position 14 selected by the spring force 13, from which position it can be switched over into the gear release position 12 by the minimum excitation of the electromagnet 23.

In the gear retention position 14, the housing connections 27, 28 of the respective conduit sections 15, 16 are shut off from one another by a control edge 40 of the valve spool 21 and, thereby, the control pressure conduit 10 is shut off while the housing connection 27 of the conduit section 15 of the control pressure conduit 10, leading to the selector valve 7 is connected to the housing connection 26, of the control pressure conduit 37 connected to the working pressure conduit 6, by a control groove 41 of the valve spool 21.

In the gear release position 12 (shown in dot-dash line in FIG. 3) of the valve spool 21, the control edge 40 releases the connection between the housing connections 27 and 28 and, therefore, the control pressure conduit 10, while the control groove 41 interrupts the connection between the housing connections 26 and 27. Therefore, the control pressure conduit 10 is shut off from the control pressure conduit 37.

The selector valve 7, the control valve 9 and the gear retention control valve 11 are combined by the valve housing 25 into a pressure control unit. For this purpose, the valve housing 25 has a second central hole 42 aligned with the first central hole 30, to accommodate a valve spool 18 and also has housing connections 43 to 48, themselves connected to the central hole 42, for the connection of the conduit section 15 of the control pressure conduit 10, of the conduit section 37a of the control pressure conduit 37 located between the selector valve 7 and the throttle 38, of a pressure-relieved return, of the working pressure conduit 6, of the system pressure conduit 36 and for a further pressure-relieved return.

The valve spool 18 has two control edges 49, 50 (FIG. 2) which, in the illustrated deactivated position of the valve spool 18 brought about by spring force 19, connect the housing connection 46 of the working pressure conduit 6 to the housing connection 45 for the return and shut it off from the housing connection 47 of the system pressure conduit 36. In the respective gear position of the valve spool 18 actuated by control pressure force, on the other hand, the control edges 49, 50 connect it more or less to the housing connection 47 of the system pressure conduit 36 and correspondingly throttle it relative to the housing connection 45 for the return.

The valve spool 18 has a collar 17 with a spool pressure surface 20 and an end thereof and, acting in the opposite direction, an annular spool pressure surface 51 on the other end thereof. The spool pressure surface 20 is permanently subject to the pressure of the housing connection 43 for the conduit section 15 of the control pressure conduit 10. The other spool pressure surface 51 is permanently subject to the pressure of the housing connection 44 for the conduit section 37a of the control pressure conduit 37 connected to the working pressure conduit 6.

When there is sufficient system pressure present and the electronic control unit 8 is ready for action, the control valve 9 always receives a current with a minimum current strength of, for example, 2% of a maximum current strength. This minimum current strength generates a sufficient magnetic force on the armature 22 for the latter to move the valve spool 21 into its gear release position 12 against the spring force 13. The pilot control pressure of the control pressure conduit 10 then acts on the end spool pressure surface 20 but the resulting spool pressure force is too small to overcome the spring force 19. The selector valve 7 therefore remains in its deactivated position so that the pressure at the controller output 46 is zero.

If, on one hand, the clutch 4 is activated because the selector setting element 5 is subjected to pressure, the control unit 8 generates a current whose magnitude is between 3% and 100% of the maximum current strength in order to excite the electromagnet 23 which adjusts the control pressure at the shut-off valve 32 in proportion to the current strength. This control pressure causes the selector valve 7 to control, via the control pressure conduit 10, the working pressure at the controller output 46 in proportion to the control pressure.

If, on the other hand, the working pressure has to be deactivated by the selector setting element 5 in order to disengage the clutch 4, the control unit controls or reduces the excitation current of the electromagnet 23 back to the value of 2% of the maximum current strength so that the valve spool 21 remains in its gear release position 12.

The pressure threshold formed from the spool pressure surfaces 20, 51 of the collar 17 and from the spring force 19 has particular importance in the case of a failure of the excitation current of the electromagnet 23 because the magnetic force at the valve spool 21 then disappears, and the valve spool 21 is moved into its gear retention position 14 (dot-dash line in FIG. 3) by the spring force 13. As a result, the working pressure and control pressure of the working pressure conduit 6 is switched onto both spool pressure surfaces 20, 51 so that only the spool pressure force resulting from the difference between the spool pressure surfaces 20, 51 acts against the spring force 19. The pressure threshold of spring force 19 and 20 and surfaces 51 is effective as resistance in the movement of the valve spool 18 into the gear position with the housing connection 45 for the return shut off and unthrottled connection between the housing connections 46, 47 of the working pressure conduit 6 and the system pressure conduit 36.

If, in the case of an electrical failure, the level of the working pressure is not sufficient to overcome the pressure threshold of the spring force 19 and 20 and surfaces 51, the selector valve 7 is deactivated, and therewith the working pressure. This deactivation can be advantageous in order to prevent pressure being applied to several selector setting elements and, in consequence, jamming the gearbox.

In the case of failure of the electronic control unit 8, either by a cable break or by failure of the on-board network, the above-discussed pressure threshold of the spring force 19 and 20 and surfaces 51 permits the hydraulic retention of the selected gear by way of system pressure within a definable pressure retention range.

This is because, if the level of the controlled working pressure in the case of electrical failure is sufficient to overcome the pressure threshold of the spring force 19 and 20 and surfaces 51, the selector valve 7 connects the working pressure conduit 6 to the system pressure conduit 36. This condition is maintained until such times as the system pressure falls below the aforementioned pressure threshold, which occurs in a vehicle when the engine is switched off.

The fault case considered due to interruption of the excitation of the magnet of the control valve 9, either due to a defect in the electronic control unit or due to failure in the voltage supply, cannot lead to an interruption of the force path in the gearbox in the case of a working pressure higher than the pressure threshold of the spring force 19 and 20 and surfaces 51. This avoids dangerous driving conditions because the gear position which has just been selected is retained.

The compact valve configuration with a common valve housing 25 for the selector valve 7, the control valve 9 and the gear retention control valve 11 permits direct response of the gear retention function 14 in the event of a fault occurrence. No collapse of pressure can occur during the response phase. When the system pressure of the system pressure conduit 36 is deactivated (i.e. engine at rest), the defined "neutral" rest position (no force path in the gearbox) is reached. Because current flows continuously through the control valve 9, the control unit 8 can recognize and locate an electrical defect.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An automatic selector device of a change-speed gearbox of a motor vehicle, comprising an electronic control unit, a frictional connection, a selector setting element operatively arranged for selectively engaging the frictional connection, a selector valve having at least one gear position for subjecting the selector setting element to working pressure and one zero position for switching off the working pressure from the selector setting element, a spring device providing a spring force to move the selector valve into the zero position, a first pressure surface acting in opposition to the spring device and arranged to be subjected to a control pressure to move the selector valve into a gear position, the first pressure surface being dimensioned such that the pressure force which results from the control pressure generated by the minimum excitation is smaller than the spring force for moving the selector valve into the zero position, an electromagnetic control valve adapted to be excited by the electronic control unit and arranged to adjust the control pressure in proportion to excitation of the electromagnetic control valve to move the selector valve into a gear position, a control pressure conduit operatively arranged to selectively connect the selector valve to the control valve, a gear retention control valve located in the control pressure conduit and having a gear release position and a gear retention position, a spring device providing a spring force for moving the gear retention control valve into the gear retention position, an auxiliary control force, resulting from a magnetic force of the electromagnetic control valve caused by a permanent minimum excitation, which auxiliary control force is sized to move the gear retention control valve into the gear release position, and a conduit section of the control pressure conduit, for connecting the selector valve to the gear retention control valve, while in the gear release position, being connected to the control valve and shut off from the selector setting element, and in the gear retention position, is connected to the selector setting element and shut off from the control valve.

2. The automatic selector device according to claim 1, wherein the electromagnetic control valve includes an electromagnetic with an armature, and a valve spool of the gear retention control valve is arranged to be movable into the gear release position by a pressure piece connected to the armature so that the valve spool is prevented from moving relative to this armature.

3. The automatic selector device according to claim 1, wherein a valve housing has, in addition to three housing connections of the gear retention control valve, an additional housing connection for a pressure-relieved return and a central hole, connected to the three housing connections, for the valve spool, and the valve spool has a valve passage for a shut-off valve of the control valve, and one end of the valve passage is connected to the housing connection for a section of the control pressure conduit operatively associated with the control valve and another end of the valve passage has a valve seat for a valve closing element arranged to be actuatable by the pressure piece and is operationally located between the valve passage and the additional housing connection for the pressure-relieved return.

4. The automatic selector device according to claim 1, wherein the selector valve has a second pressure surface acting in a direction opposite to the first pressure surface subject to the control pressure of the control valve, the second pressure surface arranged to be subjected to a control pressure proportional to the working pressure of the selector setting element.

* * * * *